(12) United States Patent
Folta et al.

(10) Patent No.: US 8,099,599 B2
(45) Date of Patent: Jan. 17, 2012

(54) CONTROLLING ACCESS TO DATA STREAMS

(75) Inventors: Florin Folta, Redmond, WA (US); Serge Smirnov, Redmond, WA (US); Kishore Kotteri, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 12/202,052

(22) Filed: Aug. 29, 2008

(65) Prior Publication Data

US 2010/0058061 A1    Mar. 4, 2010

(51) Int. Cl.
| | |
|---|---|
| H04L 9/32 | (2006.01) |
| H04L 29/06 | (2006.01) |
| H04L 9/00 | (2006.01) |
| G06F 12/14 | (2006.01) |
| G06F 7/04 | (2006.01) |
| H04N 7/167 | (2006.01) |

(52) U.S. Cl. ........ 713/171; 713/160; 713/165; 713/167; 713/187; 713/189; 726/26; 380/239; 380/44

(58) Field of Classification Search ................... 713/171, 713/160, 165, 167, 187, 189; 726/26; 380/239, 380/44
See application file for complete search history.

(56) References Cited

U.S. PATENT DOCUMENTS

| | | | |
|---|---|---|---|
| 4,935,961 A | 6/1990 | Gargiulo et al. | |
| 5,796,830 A | 8/1998 | Johnson et al. | |
| 6,338,139 B1 | 1/2002 | Ando et al. | |
| 6,367,010 B1 | 4/2002 | Venkatram et al. | |
| 6,449,721 B1 | 9/2002 | Pensak et al. | |
| 6,647,494 B1 | 11/2003 | Drews | |
| 7,263,722 B1 | 8/2007 | Luo et al. | |
| 7,360,252 B1 * | 4/2008 | Torrubia-Saez | ................ 726/27 |

FOREIGN PATENT DOCUMENTS

WO    WO 00/11870    3/2000

OTHER PUBLICATIONS

"Deliverable D2.4: Literature Study and Survey on Applicable Technologies," Vivaldi Project, Document Workpackage 2, Final Version, Aug. 14, 2006, 50 pages.

Lawson, "Protecting the protection code," root labs rdist, Mar. 23, 2007, 5 pages.

"Windows Media 9 Series Beta: Technical Review," Streaming Media Bible, Streaming Magazine Column, Sep. 2002, 4 pages.

* cited by examiner

*Primary Examiner* — Aravind Moorthy

(74) *Attorney, Agent, or Firm* — Klarquist Sparkman, LLP

(57) ABSTRACT

Access to one or more data streams can be controlled by encrypting a description of how segments of the data streams can be assembled, for example, to produce an audio or video program. Access to the one or more data streams can also be provided by obfuscating names of at least some of the segments in order to make it more difficult to determine the proper order for assembling the segments. In at least some embodiments, the data contained in at least some of the segments themselves is not encrypted.

20 Claims, 12 Drawing Sheets

CONTROLLING ACCESS TO DATA STREAMS

FIELD

This disclosure pertains to controlling access to data streams, for example, multiple bitrate media data streams.

BACKGROUND

Digital information is often distributed over a network, such as the Internet. Such digital information can include, for example, audio and/or video data. Distributors and owners of rights in the information often wish to control the viewing, copying and/or distribution of the information. Various digital rights management (DRM) schemes can encrypt the digital information to prevent unauthorized access to it. However, implementing a DRM scheme can sometimes be expensive and/or impractical.

SUMMARY

Access to one or more data streams can be controlled (e.g., limited to one or more authorized users) by encrypting a description of how segments of the data streams should be assembled, for example, to produce an audio or video program. Access to the one or more data streams can also be provided by obfuscating names of at least some of the segments in order to make it more difficult to determine the proper order for assembling the segments. In some embodiments, the data contained in at least some of the segments themselves is not encrypted.

In particular embodiments, a computer-implemented method comprises: encrypting a first portion of a description of a plurality of unencrypted data segments, the plurality of unencrypted data segments forming a program, wherein the first portion of the description comprises an order for the plurality of unencrypted data segments; obfuscating segment names for the plurality of unencrypted data segments; and storing in one or more computer-readable storage media the encrypted first portion of the description of the plurality of unencrypted data segments, the obfuscated segment names for the plurality of unencrypted data segments, a second portion of the description of the plurality of unencrypted data segments comprising a key used for encrypting the first portion of the description, and the plurality of unencrypted data segments. The key used for encrypting the first portion of the description of the plurality of unencrypted data segments can comprise a first key combined with a second key. Sometimes the first key is associated with the program, and the second key is associated with an encoder. The second portion of the description of the plurality of data segments can further comprise: a unique identifier; a length of the key used for encrypting the first portion of the description of the plurality of unencrypted data segments; and a key used for the obfuscating segment names for the plurality of unencrypted data segments. In some cases the second portion of the description of the plurality of data segments further comprises a size of the encrypted first portion of the description of the plurality of unencrypted data segments. In particular embodiments the data segments form a first version of the program and a second version of the program, and the first portion of the description comprises a first data segment order for the first version of the program and a second data segment order for the second version of the program. The first version of the program can be compressed at a first bitrate and the second version of the program can be compressed at a second bitrate. In further embodiments the second portion of the description of the plurality of unencrypted data segments is encrypted. In additional embodiments obfuscating segment names for the plurality of unencrypted data segments comprises generating one or more segment names based on one or more data from a pseudorandom sequence. In further embodiments obfuscating segment names for the plurality of unencrypted data segments comprises generating a key for a selected segment based at least in part on a base key and encrypting the segment name of the selected segment using the generated key. Generating the key for the selected segment based at least in part on the base key can comprise combining the base key with a portion of a name of the selected segment. The method can further comprise transmitting to a client computer the encrypted first portion of the description of the plurality of unencrypted data segments, the obfuscated segment names for the plurality of unencrypted data segments and the second portion of the description of the plurality of unencrypted data segments.

In additional embodiments, a computing device comprises: a processor and one or more computer-readable storage media containing instructions configured to cause the computing device to perform a method comprising: decrypting a description of a plurality of unencrypted data stream segments; based on the decrypted description of the plurality of unencrypted data stream segments, de-obfuscating filenames for one or more of the plurality of the unencrypted data stream segments; based on the de-obfuscated filenames, determining a presentation order for at least some of the plurality of unencrypted data stream segments; and storing the presentation order in one or more computer-readable storage media. The method can further comprise displaying the at least some of the plurality of unencrypted data stream segments according to the presentation order. In particular embodiments, decrypting the description of the plurality of unencrypted data stream segments comprises: decrypting a header portion of the description of the plurality of unencrypted data stream segments to obtain a key; decrypting a manifest portion of the description of the plurality of unencrypted data stream segments using the obtained key; and storing the decrypted manifest portion of the description of the assembling order in one or more computer-readable storage media. In some cases de-obfuscating filenames for one or more of the plurality of the data stream segments comprises: generating a key for a filename of a selected one of the plurality of unencrypted data stream segments, wherein the key is based on information contained in the decrypted description of the plurality of unencrypted data stream segments and one or more characteristics of the selected one of the plurality of unencrypted data stream segments; decrypting the filename of the selected one of the plurality of unencrypted data stream segments using the generated key; and storing the decrypted filename in one or more computer-readable storage media. The description of the plurality of unencrypted data stream segments can comprise presentation orders for two or more data streams encoded at two or more bitrates.

In additional embodiments, one or more computer-readable storage media contain instructions configured to cause a computer to perform a method comprising: obfuscating names of a plurality of data segments for a plurality of bitrate streams for transmitting a media program, wherein the data segments comprise unencrypted media program content; encrypting a description of one or more assembling orders of the plurality of data segments for one or more of the plurality of bitrate streams; and storing in one or more computer-readable storage media the encrypted description of the one or more assembling orders of the plurality of data segments, the encrypted names of the one or more of the plurality of data segments and the unencrypted media program content. The method can further comprise transmitting the encrypted description of the one or more assembling orders of the plurality of data segments to a remote computer. In particular embodiments, the method can further comprise transmitting the plurality of data segments to a remote computer in an order other than the one or more assembling orders.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The disclosed technologies are not limited to any specific aspect or feature, or combination thereof, nor do the disclosed methods and apparatus require that any one or more specific advantages be present or problems be solved.

DETAILED DESCRIPTION

Disclosed below are embodiments of user data stream access control technologies and/or related systems and methods. The embodiments should not be construed as limiting in any way. Instead, the present disclosure is directed toward all novel and nonobvious features and aspects of the various disclosed methods, apparatus, and equivalents thereof, alone and in various combinations and subcombinations with one another.

As used in this application and in the claims, the singular forms "a," "an" and "the" include the plural forms unless the context clearly dictates otherwise. Additionally, the term "includes" means "comprises." The phrase "and/or" can mean "one or more of" the elements described in the sentence. Embodiments described herein are exemplary embodiments of the disclosed technologies unless clearly stated otherwise.

Although the operations of some of the disclosed methods and apparatus are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed methods and apparatus can be used in conjunction with other methods and apparatus.

Any of the methods described herein can be performed or simulated (at least in part) using software comprising computer-executable instructions stored on one or more computer-readable storage media. Furthermore, any intermediate or final results of the disclosed methods can be stored on one or more computer-readable storage media. Computer-readable storage media can include non-volatile storage such as, for example, read-only memory (ROM), flash memory, hard disk drives, floppy disks and optical disks. Computer-readable storage media can also include volatile storage such as, for example, random-access memory (RAM), device registers and processor registers. Any such software can be executed on a single computer or on a networked computer (for example, via the Internet, a wide-area network, a local-area network, a client-server network, or other such network). For clarity, only certain selected aspects of the software-based implementations are described. Other details that are well known in the art are omitted. For the same reason, computer hardware is not described in further detail. It should be understood that the disclosed technology is not limited to any specific computer language, program, or computer. For instance, a wide variety of commercially available computer languages, programs, and computers can be used.

Figure 1:
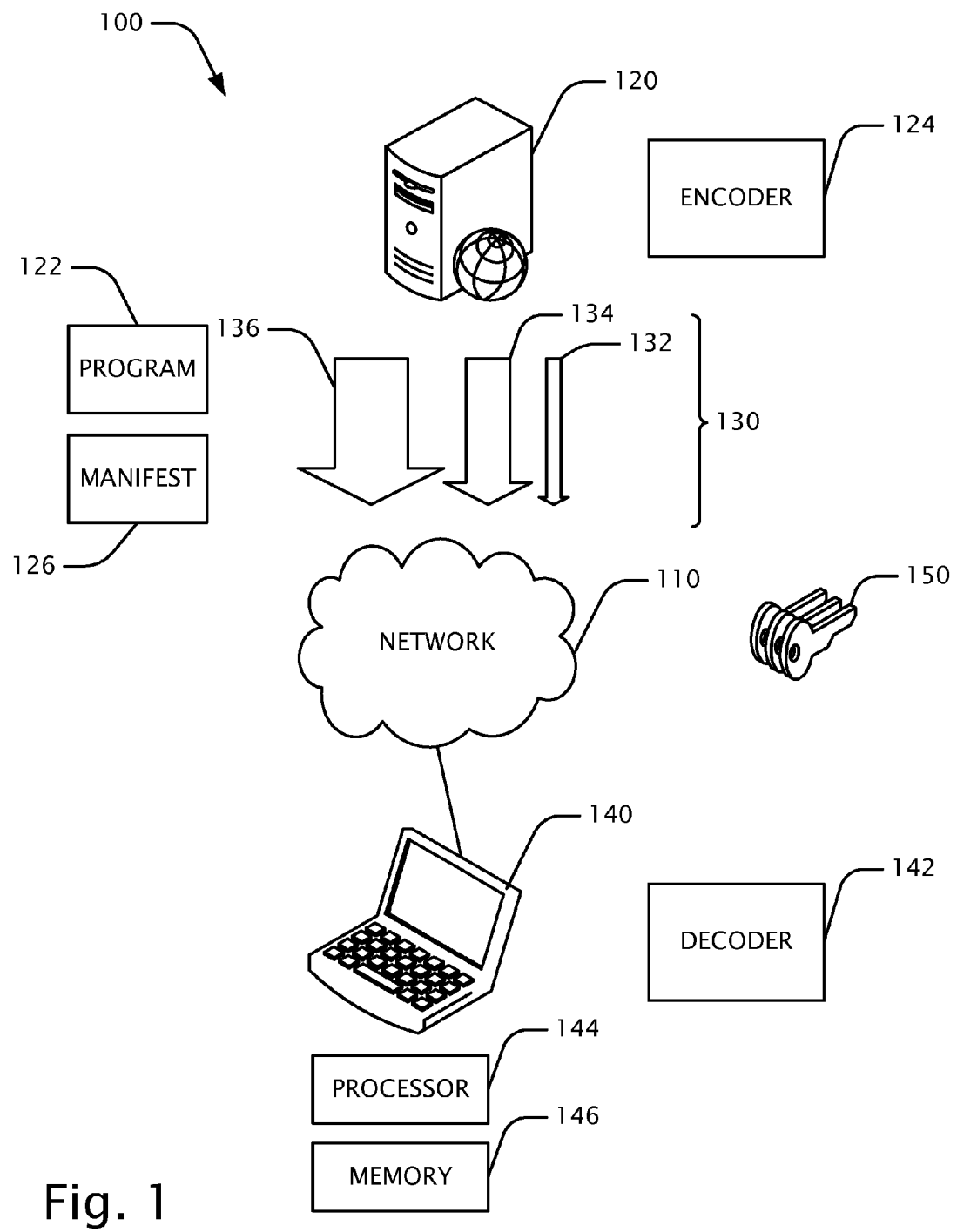
FIG. 1 is a diagram of an exemplary embodiment of a system for distributing digital data over a network.

FIG. 1 is a diagram of an exemplary embodiment of a system 100 for distributing digital data. A computer, such as a server 120 or other computer, transmits a program 122 in one or more data streams 130 over a network 110 to one or more client computers 140. The data streams 130 are created by an encoder 124 from a description of the program 122 (e.g., the program 122 is compressed and/or encoded by the encoder 124 to create the data streams 130). In some embodiments the encoder 124 is realized at least in part by software running on the server 120. In further embodiments the encoder 124 is realized at least in part by software running on one or more other computers. The program 122 can comprise, for example, media program content such as audio and/or video data, as well as other types of data. In various embodiments, the network 110 can comprise, for example, the Internet, a wide-area network, a local-area network, a client-server network, and/or another network of two or more computers. The client computer 140 can comprise a computing device, for example, a desktop computer, a laptop computer, a handheld computer, a personal digital assistant (PDA), a cell phone, a smartphone, a media-playing device (for example, a music player, a video player, and/or a processor-based device configured to work in conjunction with a television or other display device) and/or other such devices. The client computer 140 can comprise one or more processors 144 and memory 146. In some embodiments the one or more data streams 130 comprise a plurality of data streams carrying multiple versions of a given program, but with different settings (e.g., compressed at multiple bitrates). For example, a data stream 132 can carry a "low-bandwidth" version of a program, a data stream 134 can carry a "medium-bandwidth" version of the program, and a data stream 136 can carry a "high-bandwidth" version of the program. Differences among the data streams 132, 134, 136 can result from, for example, different compression ratios, different sampling rates, different bitrates and/or different display sizes, as well as one or more other factors. Generally, a given client computer 140 receives one data stream 130 at a time, although in some cases the client computer 140 can receive multiple data streams 130 at a time. A decoder 142 processes the received one or more data streams 130. Generally, the decoder 142 is realized at least in part by software running on the client computer 140. In further embodiments the decoder 142 is realized at least in part by software running on one or more other computers. In at least some embodiments, the one or more processed data streams can be displayed and/or played on the client computer 140. The encoder 124 and the decoder 142 use one or more keys 150 to encrypt and/or decrypt data associated with the one or more data streams 130.

Figure 2:
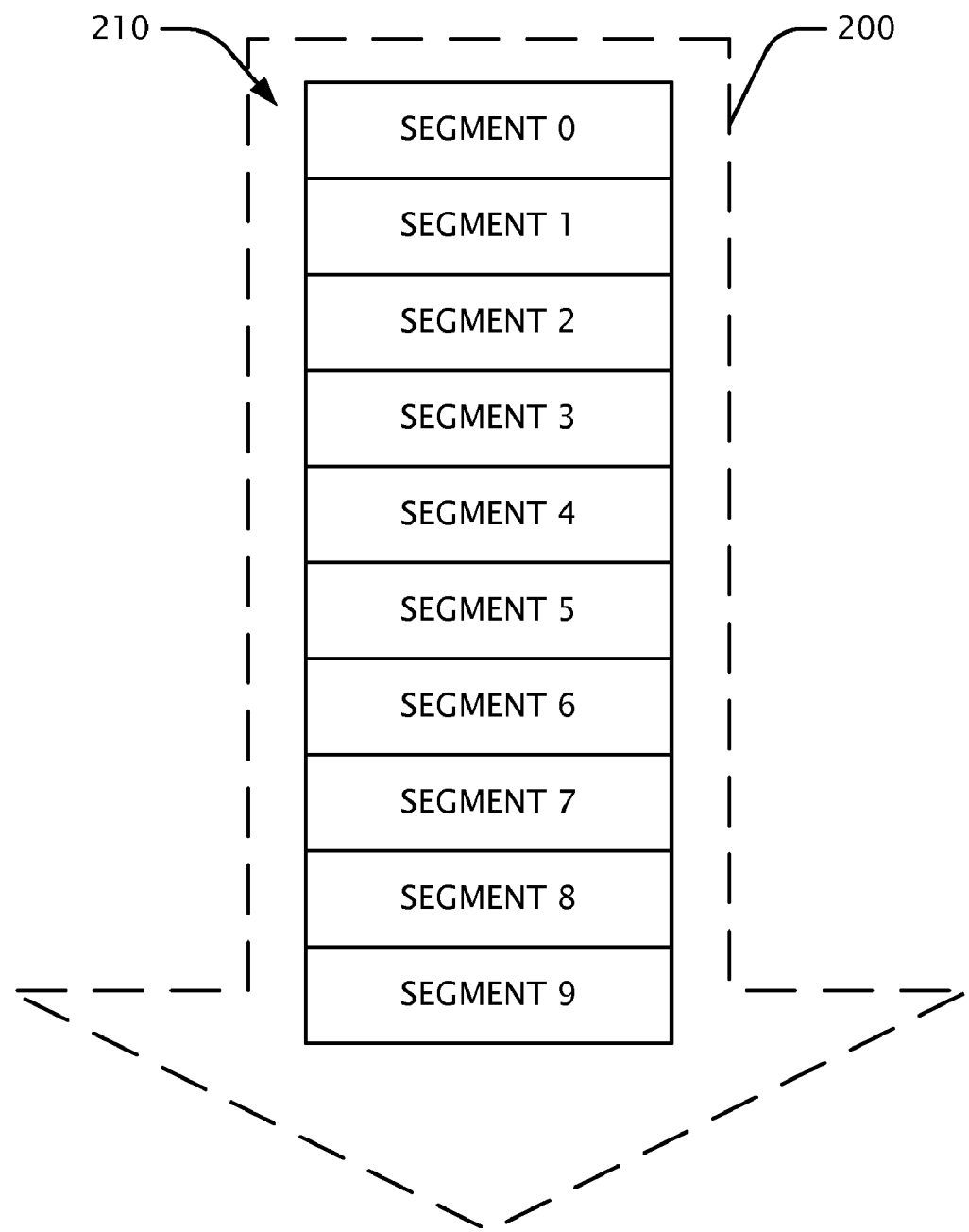
FIG. 2 is a block diagram of an exemplary embodiment of a data stream.

FIG. 2 is a diagram of an exemplary embodiment of a data stream 200, generally similar to the one or more data streams 130. The data stream 200 comprises a plurality of segments 210, which in the depicted embodiment are numbered "Segment 0" through "Segment 9." Each of these segments is a portion of the program 122. For example, in some embodiments the segments are each 2-5 seconds long. Other embodiments can use segments of other lengths, including multiple lengths. Thus, the program 122 is typically provided to the client computer 140 in hundreds or thousands of segments for a given one of the one or more data streams 130.

In some embodiments, the segments 210 are provided to the client computer 140 in a "scrambled" order (e.g., in an order other than an order which would allow a user of the client computer 140 to use the file in a coherent manner). For the client computer 140 to, for example, properly display and/or play the program 122, the client computer 140 needs to be able to determine a proper assembling order for the segments 210 of a given data stream 130. In at least some embodiments, a description is provided by a manifest 126, as shown in FIG. 1. The manifest 126 can comprise a text or binary description of segments to be assembled for one or more data streams 130. In some embodiments, the manifest 126 comprises a mark-up-language description (e.g., in XML or another mark-up language).

Figure 3:
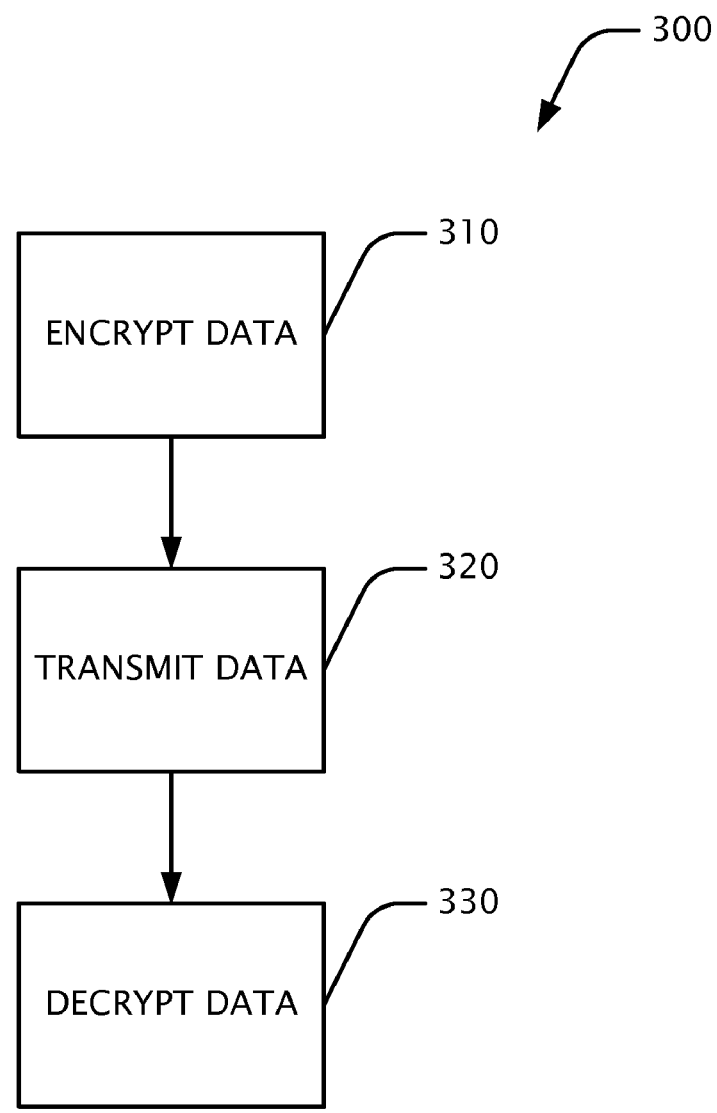
FIG. 3 is a block diagram of an exemplary embodiment of a method for transmitting data.

FIG. 3 shows an exemplary embodiment of a method 300 for transmitting data such as the program 122 to the client computer 140 over the network 110. In a method act 310, at least some data associated with segments 210 of the program 122 is encrypted and/or obfuscated by the encoder 124. In at least some embodiments, one or more of the segments 210 themselves are not encrypted and/or obfuscated. Instead, as explained below, data associated with the program 122 that is encrypted and/or obfuscated can include the manifest 126 and/or the names of one or more segments 210. In some embodiments the manifest 126 is compressed. In a method act 320, the encrypted data is transmitted to the client computer 140, and the transmitted data is decrypted in a method act 330 by the decoder 142.

Figure 4:
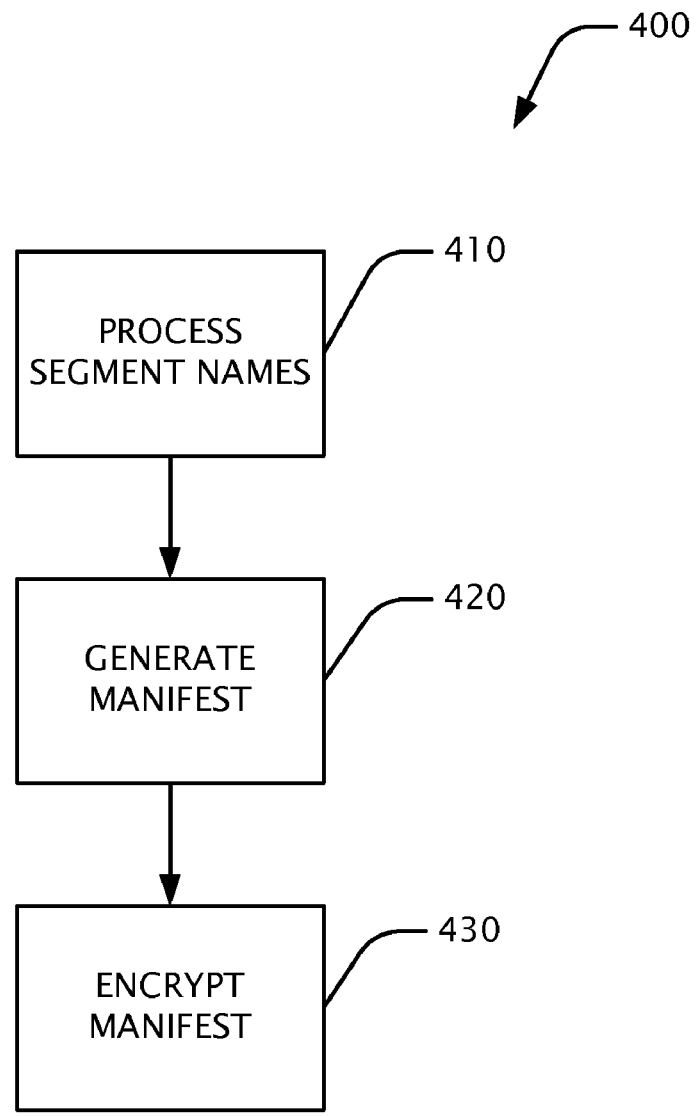
FIG. 4 is a block diagram of an exemplary embodiment of a method for encrypting and/or obfuscating at least some data associated with a program.

FIG. 4 shows an exemplary embodiment of a method 400 for encrypting and/or obfuscating at least some data associated with segments 210 of the program 122. In a method act 410, the segment names are processed (e.g., obfuscated). The manifest 126 is generated in a method act 420. The manifest 126 is encrypted in a method act 430. The method acts of FIG. 4 are described in more detail below.

Figure 5:
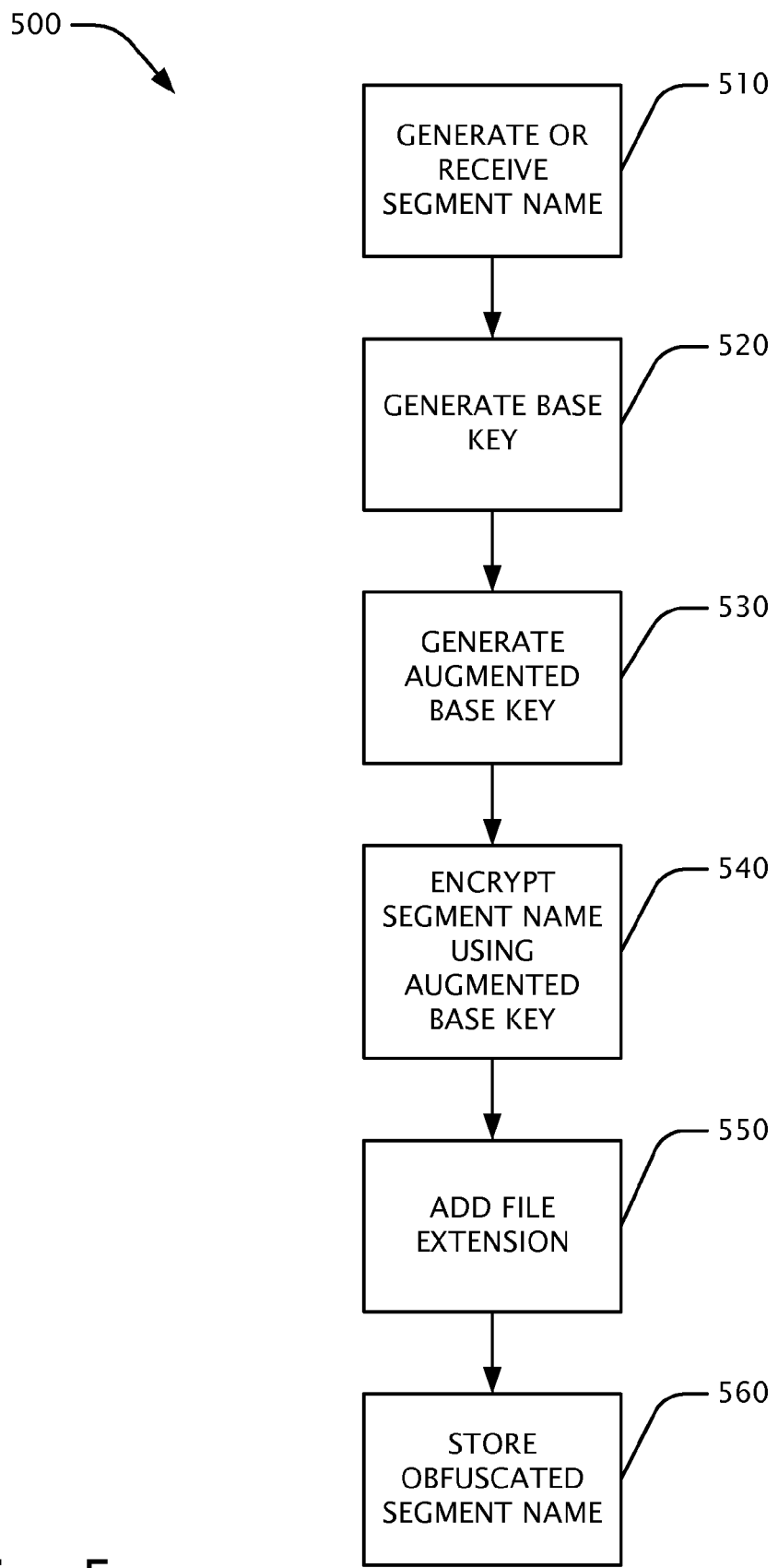
FIG. 5 is a block diagram of an exemplary embodiment of a method for obfuscating one or more segment names.

As part of the method act 410, FIG. 5 shows an exemplary embodiment of a method 500 for obfuscating one or more names of segments comprising the one or more data streams 130. In a method act 510, one or more segment names are generated or received. In some embodiments, the segment names follow a given format. For example, one format for segment names is based on a program name, a bitrate of a selected data stream (e.g., in KB/s), and an index for the segment. The index allows the client computer 140 to order the segments for presentation. Using this naming scheme, one example segment name reads "show1_128_123," indicating that this segment is number 123 from the 128 KB/s data stream version of a program titled "show1."

In a method act 520, a base key is generated. In some embodiments, the base key comprises a random array of 10 bytes. Other sizes (e.g., 16 bytes) or types of data can also be used for the base key. An augmented base key is created in a method act 530 by appending additional data to the base key. For example, data associated with a segment's bitrate and/or index can be appended to the base key. In particular embodiments, the base key is combined (e.g., concatenated) with an array of bytes (e.g., 4 bytes, or another number of bytes) containing the little endian numerical value of the segment's index and/or an array of bytes (e.g., 4 bytes, or another number of bytes) containing the little endian numerical value of the segment's bitrate. This approach can allow for creation of a unique augmented base key for each segment. In a method act 540, a segment name is encrypted using the unique augmented base key for that segment. However, in further embodiments, an augmented base key is used to encrypt names of two or more segments. The segment's obfuscated name can be represented, for example, as the base 16 version of the encrypted segment name. In further embodiments, a file extension is added to the obfuscated segment name in a method act 550. For example, ".vid" can be added to obfuscated names of video stream segments, and ".aud" can be added to obfuscated names of audio stream segments. One or more other extensions can be used for other data types. One or more obfuscated segment names can be stored in one or more computer-readable storage media in a method act 560.

In further embodiments, one or more segment names are based at least in part on a number in a sequence of pseudorandom numbers. For example, a portion of a file name can include a number from the sequence of pseudorandom numbers. A presentation order for two or more segments can be determined at least in part according to the sequence of pseudorandom numbers. For example, if three consecutive numbers from a given pseudorandom sequence are 19395, 20493 and 59302, then the segments segment19395, segment20493 and segment59302 can be presented in this order. In particular embodiments the encoder 124 and the decoder 142 use a common seed to generate the pseudorandom number sequence. In some cases the common seed can be generated using a first seed portion and a second seed portion. The first and second seed portions can be provided to the encoder 124 and the decoder 142 at different times. For example, the first seed portion can be a fixed portion built-in to the encoder 124 and the decoder 142, while the second seed portion can be a portion (e.g., a variable portion) transmitted between the encoder 124 and the decoder 142. In further embodiments only one seed portion is used.

Figure 6:
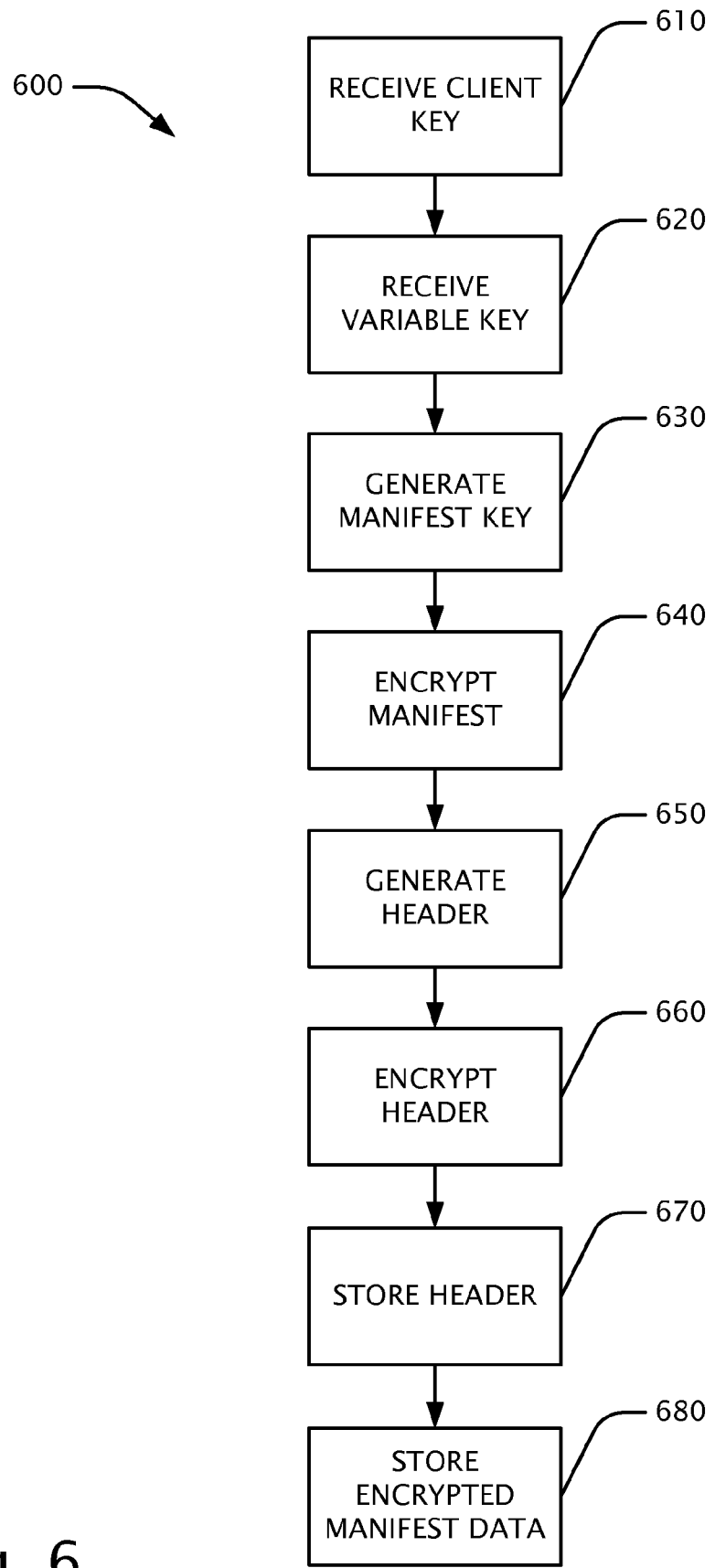
FIG. 6 is a block diagram of an exemplary embodiment for encrypting a manifest and a manifest header.

As part of the method act 430, FIG. 6 shows an exemplary embodiment of a method 600 in which the manifest is encrypted. In a method act 610, a "client key" is received. The client key is generally an encryption key that is available to the encoder 124 and the decoder 142. In at least some embodiments the client key has a fixed, known length. In a method act 620, a "variable key" is received. The variable key is an encryption key which, in at least some embodiments, is shorter than the client key and has a randomly selected length. For example, in some embodiments the length of the variable key is 118-138 bytes. Further embodiments can use variable keys of other lengths. In particular embodiments the variable key is randomly generated. In at least some embodiments, a different variable key is used for each program 122.

Figure 7:
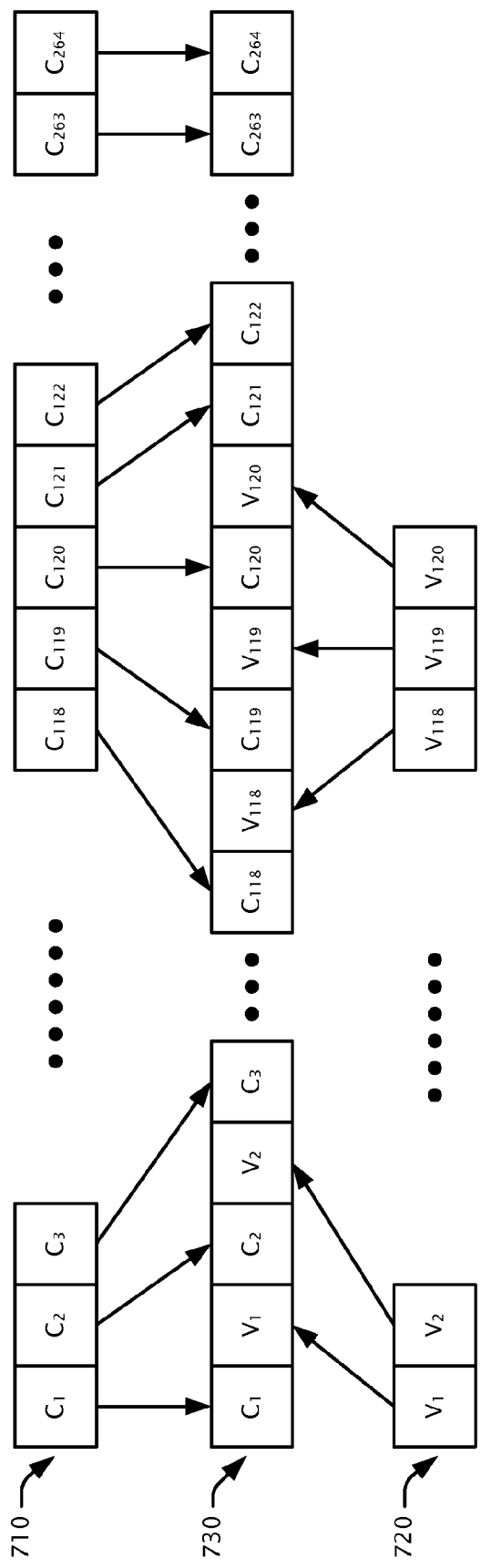
FIG. 7 is a diagram of an exemplary embodiment of a primary manifest key constructed from a client key and a variable key.

In a method act 630, an encryption key called a "manifest key" of length x bytes is generated. In some embodiments, the manifest key is generated by combining at least a portion of the variable key with at least a portion of the client key. The combining can comprise, for example, interleaving portions of the variable and client keys. FIG. 7 shows an exemplary embodiment of a client key 710 comprised of bytes $C_1$, $C_2$, $C_3$, ... $C_{264}$ and a variable key 720 comprised of bytes $V_1$, $V_2$, $V_3$ ... $V_{120}$. To form the primary manifest key 730, the client key 710 and the variable key 720 are interleaved using all 120 bytes of the variable key 720, such that the beginning portion of the primary manifest key comprises bytes $C_1$, $V_1$, $C_2$, $V_2$, $C_3$, $V_3$ .... In further embodiments, the client and variable keys can be combined using other patterns, for example, $C_1$, $C_2$, $V_1$, $C_3$, $C_4$, $V_2$ .... In particular embodiments, such as the embodiment of FIG. 7, where the variable key 720 is shorter than the client key 710, all of the bytes of the variable key 720 can be interleaved with some bytes from the client key 710 without the interleaved result being sufficiently long to produce a primary manifest key 730 of length x bytes. In such cases, one or more additional, non-interleaved bytes from the client key 710 can be added to the primary manifest key 730 such that that the primary manifest key 730 has a length of x bytes (e.g., 384 bytes). In FIG. 7, the final 144 bytes of the manifest key 730 are all from the client key 710 (i.e., client key bytes $C_{121}$ through $C_{264}$).

Returning to FIG. 6, in at least some embodiments the manifest key generated by the method act 630 is further processed by scheduling the manifest key for a given algorithm (e.g., RC4, AES128 or one or more other encryption algorithms). In particular embodiments, the internal state of the given algorithm is advanced a selected number of states (e.g., 1024 or another number of states), which can make the manifest key more secure.

In further embodiments, instead of generating a manifest key as described above, the manifest key can be provided to the encoder 124 or generated by other techniques (e.g., randomly generated).

Figure 8:
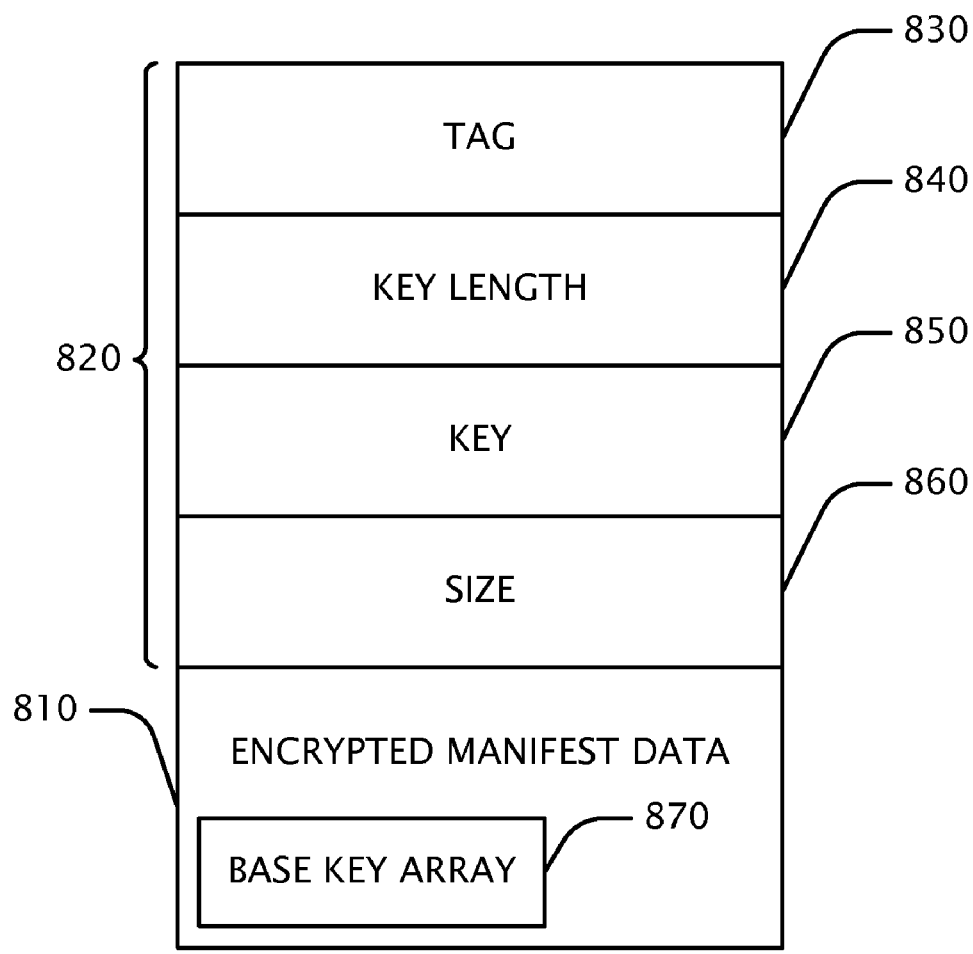
FIG. 8 is a block diagram showing an exemplary structure of a manifest and a manifest header.

In a method act 640, the manifest is encrypted using the manifest key. A variety of encryption algorithms can be used including, for example, RC4 and AES128. A manifest header describing one or more aspects of the manifest can be generated in a method act 650. FIG. 8 shows an exemplary embodiment of encrypted manifest data 810 and a manifest header 820. In the depicted exemplary embodiment, the header 820 comprises one or more of: a tag 830, which can include, for example, a globally unique identifier (GUID) of length 16 bytes, or other length; a description 840 of the key length of the manifest key used to create the encrypted manifest data 810 (the description 840 can be, for example, 1 word long); the manifest key 850 (stored as an array of bytes, for example); and a description 860 of the size of the encrypted manifest data 810. In particular embodiments, the variable key is included in the header 820 in place of the manifest key 850. This approach can potentially reduce the size of the manifest header 820. It can also avoid transmitting the manifest key 850 over a potentially insecure channel. The base key (described above with respect to FIG. 5) can be stored in the manifest data 810 as the base key array 870, as shown in FIG. 8.

Although the embodiment of FIG. 8 appears to show the encrypted manifest data 810 and the manifest header 820 as part of one data structure or file, in some embodiments these can be separate data structures or files.

Returning briefly to FIG. 6, in some embodiments the manifest header 820 is encrypted in a method act 660. This can be done using, for example, an additional encryption key available to the encoder 124 and the decoder 142. The encrypted or unencrypted header can be stored in one or more computer-readable storage media in a method act 670. The encrypted manifest data can be stored in one or more computer-readable storage media in a method act 680.

Figure 9:
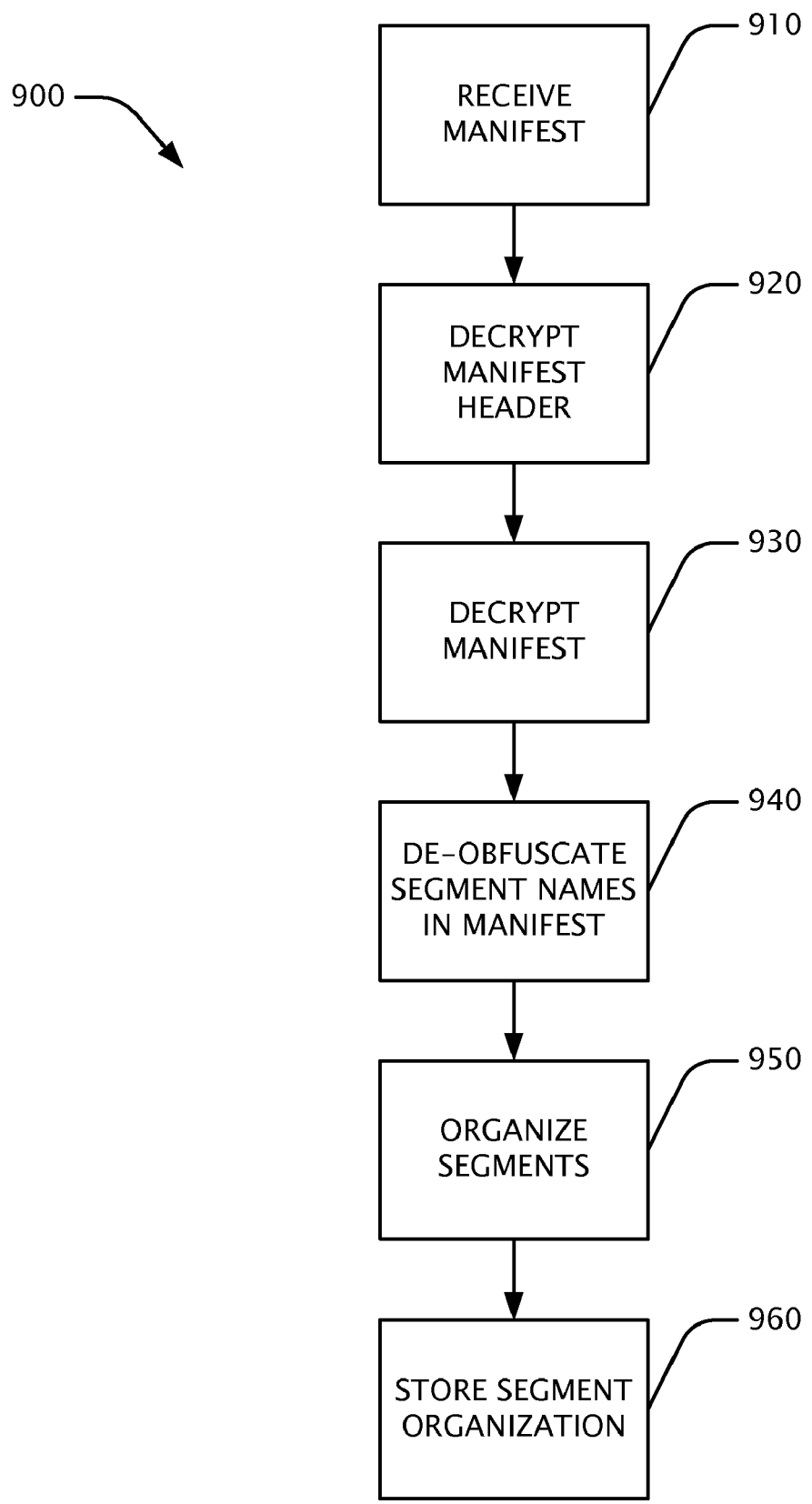
FIG. 9 is a block diagram of an exemplary embodiment of a method for processing one or more data streams.

FIG. 9 shows an exemplary embodiment of a method 900 for processing one or more data streams using at least some of the technologies described herein. The method 900 can be performed by, for example, the decoder 142. In a method act 910, the client computer 140 or other computer receives a manifest for a program. The manifest header is decrypted in a method act 920. The manifest is decrypted in a method act 930 using, for example, a key obtained at least in part by decrypting the manifest header (e.g., manifest key 850). In embodiments where the manifest header 820 comprises a variable key instead of the manifest key 850, the method act 920 can further comprise generating the manifest key 850 based on the variable key and the client key (e.g., using a technique similar to that described above for FIG. 7). In a method act 940, one or more obfuscated segment names stored in the manifest are de-obfuscated. Based at least in part on the de-obfuscated segment names, the segments are organized (e.g., placed in a suitable order for presentation) in a method act 950. In a method act 960, a description of the segment organization can be stored in one or more computer-readable storage media.

Using one or more of the disclosed technologies, in at least some cases a system such as system 100 shown in FIG. 1 can be used to transmit data (e.g., audio content, video content, still image content, as well as other types of content) over a network while controlling access to the data. The data itself does not necessarily need to be encrypted, although in some embodiments it is. The access control can result at least in part from the encrypted manifest, which can outline a proper order for a program's segments, and/or from obfuscated segment names. Generally, it is difficult to assemble the segments in a useful manner without the decrypting the manifest and/or de-obfuscating the segment names. In some cases reassembling the segments in a useful order is further complicated if the segments are stored in a file container format which uses presentation durations, rather than absolute presentation timestamps. Further embodiments can employ additional technologies for controlling access to the data. In at least some embodiments data is transmitted over the network 110 to the client computer 140 using an Internet protocol (e.g., HTTP). In particular embodiments, one or more data streams having unrestricted access to their content are transmitted with one or more data streams having restricted access to their content. The one or more data streams having unrestricted access to their content can comprise, for example, a low-bitrate version of a program.

Figure 10:
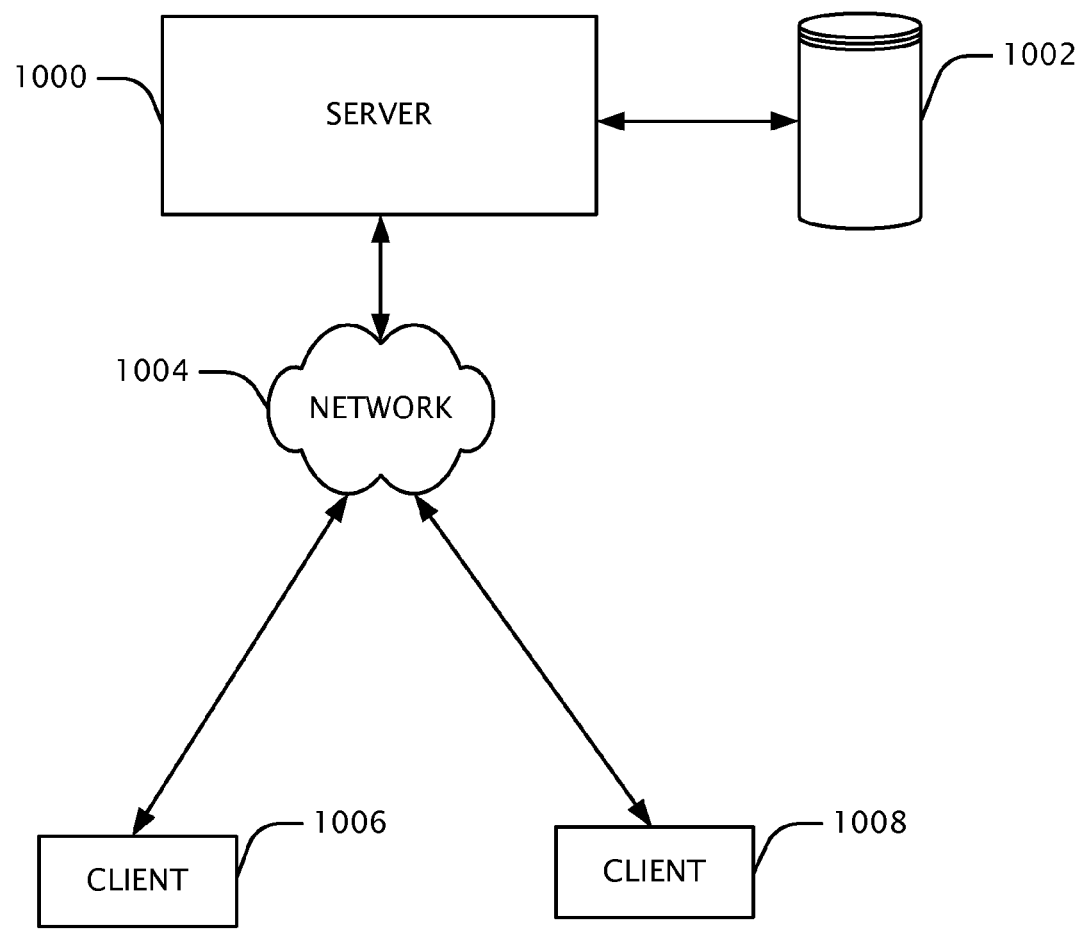
FIG. 10 is a block diagram of an exemplary embodiment of a distributed computer network.

Any aspect of the technologies described herein can be performed using a distributed computer network. FIG. 10 shows one suitable exemplary network. A server computer 1000 can have an associated storage device 1002 (internal or external to the server computer). For example, the server computer 1000 can be configured to generate any of the disclosed embodiments of encrypted and/or obfuscated data. The server computer 1000 can be coupled to a network, shown generally at 1004, which can comprise, for example, a wide-area network, a local-area network, a client-server network, the Internet, or other suitable network. One or more client computers, such as those shown at 1006, 1008, may be coupled to the network 1004 using a network protocol. The work may also be performed on a single, dedicated workstation, which has its own memory and one or more CPUs.

Figure 11:
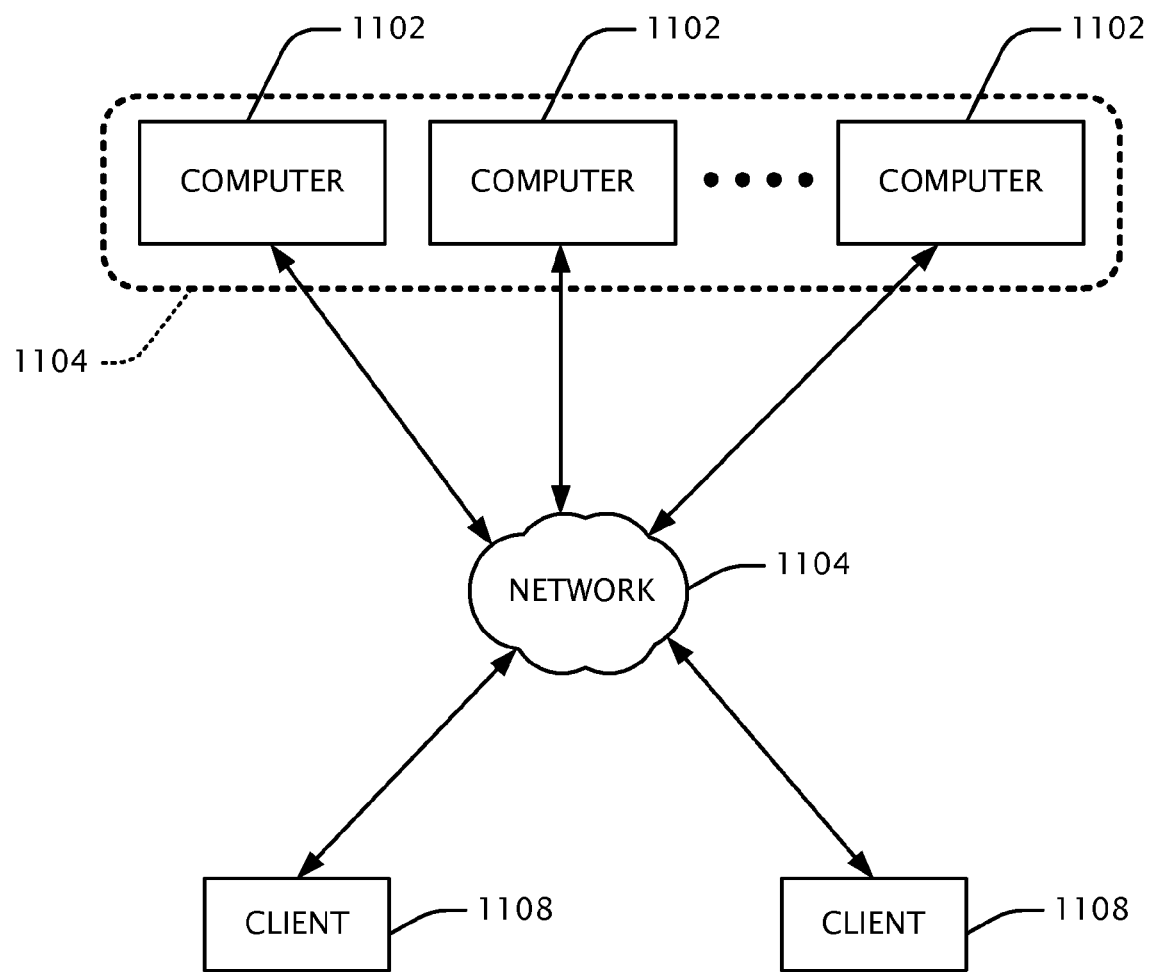
FIG. 11 is a block diagram of an exemplary embodiment of a distributed computer network.

FIG. 11 shows another exemplary network. One or more computers 1102 communicate via a network 1104 and form a computing environment 1100 (for example, a distributed computing environment). Each of the computers 1102 in the computing environment 1100 can be used to perform at least a portion of one or more of the methods described herein. The network 1104 in the illustrated embodiment is also coupled to one or more client computers 1108.

Figure 12:
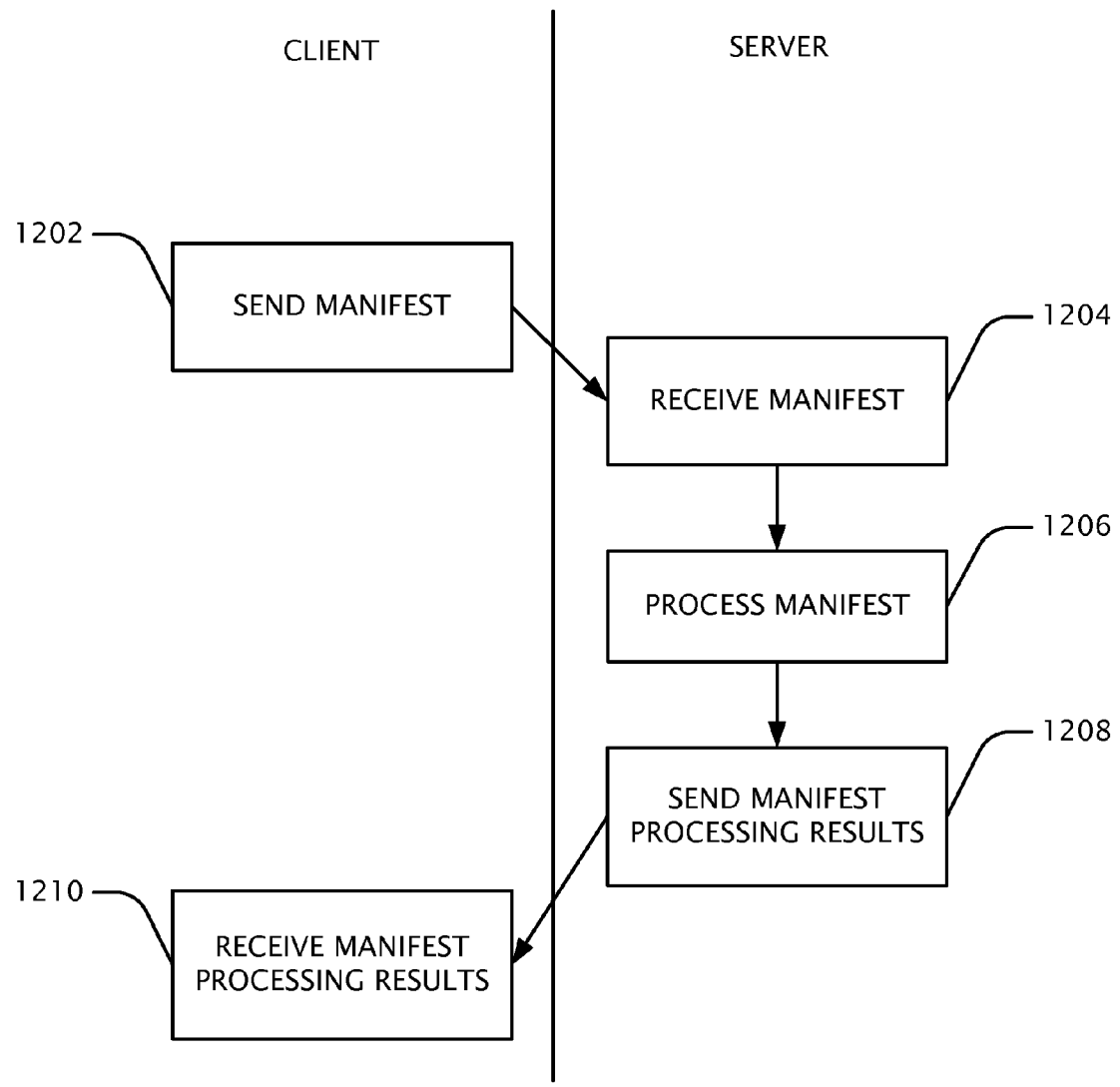
FIG. 12 is a block diagram of an exemplary embodiment of a method for processing information for a data stream.

FIG. 12 shows an exemplary embodiment of how information for a data stream (e.g., a manifest, one or more segment names) can be processed according to the disclosed technologies using a remote server computer (such as the server computer 1000 shown in FIG. 10) or a remote computing environment (such as the computing environment 1100 shown in FIG. 11). At a method act 1202, for example, the client computer sends a manifest or a portion of a manifest to the remote server or computing environment. In a method act 1204, the manifest or portion of the manifest is received and loaded by the remote server or by respective components of the remote computing environment. In a method act 1206, the manifest or manifest portion is processed using one or more of the disclosed technologies. For example, the manifest can be processed to produce an order for streaming data segments. At a method act 1208, the remote server or computing environment sends the manifest processing results to the client computer, which receives the results at a method act 1210.

It should be apparent to those skilled in the art that the example shown in FIG. 12 is not the only way to perform embodiments of the disclosed technologies using multiple computers. For instance, the manifest can be stored on a computer-readable storage medium that is not on a network and that is sent separately to the server or computing environment (for example, a CD-ROM, DVD, or portable hard drive). Or, the server computer or remote computing environment can perform only a portion of the hardware design procedures. Similar procedures using a remote server or computing environment can be performed to process encrypted and/or obfuscated data.

In view of the many possible embodiments to which the principles of the disclosed invention may be applied, it should be recognized that the illustrated embodiments are only preferred examples of the technologies and should not be taken as limiting the scope of the invention. Rather, the scope of the invention is defined by the following claims. We therefore claim as our invention all that comes within the scope and spirit of these claims.

We claim:

1. A computer-implemented method comprising:
   encrypting a first portion of a description of a plurality of unencrypted data segments, the plurality of unencrypted data segments forming a program, wherein the first portion of the description comprises an order for the plurality of unencrypted data segments;
   obfuscating segment names for the plurality of unencrypted data segments; and
   storing in one or more computer-readable storage media the encrypted first portion of the description of the plurality of unencrypted data segments, the obfuscated segment names for the plurality of unencrypted data segments, a second portion of the description of the plurality of unencrypted data segments comprising a key used for encrypting the first portion of the description, and the plurality of unencrypted data segments.

2. The computer-implemented method of claim 1, wherein the key used for encrypting the first portion of the description of the plurality of unencrypted data segments comprises a first key combined with a second key.

3. The computer-implemented method of claim 2, wherein the first key is associated with the program, and wherein the second key is associated with an encoder.

4. The computer-implemented method of claim 1, wherein the second portion of the description of the plurality of data segments further comprises:
   a unique identifier;
   a length of the key used for encrypting the first portion of the description of the plurality of unencrypted data segments; and
   a key used for the obfuscating segment names for the plurality of unencrypted data segments.

5. The computer-implemented method of claim 4, wherein the second portion of the description of the plurality of data segments further comprises a size of the encrypted first portion of the description of the plurality of unencrypted data segments.

6. The computer-implemented method of claim 1, wherein the data segments form a first version of the program and a second version of the program, and wherein the first portion of the description comprises a first data segment order for the first version of the program and a second data segment order for the second version of the program.

7. The computer-implemented method of claim 6, wherein the first version of the program is compressed at a first bitrate and the second version of the program is compressed at a second bitrate.

8. The computer-implemented method of claim 1, wherein the second portion of the description of the plurality of unencrypted data segments is encrypted.

9. The computer-implemented method of claim 1, wherein the obfuscating segment names for the plurality of unencrypted data segments comprises generating one or more segment names based on one or more data from a pseudorandom sequence.

10. The computer-implemented method of claim 1, wherein the obfuscating segment names for the plurality of unencrypted data segments comprises:
    generating a key for a selected segment based at least in part on a base key; and
    encrypting the segment name of the selected segment using the generated key.

11. The computer-implemented method of claim 10, wherein the generating the key for the selected segment based at least in part on the base key comprises combining the base key with a portion of a name of the selected segment.

12. The computer-implemented method of claim 1, the method further comprising transmitting to a client computer the encrypted first portion of the description of the plurality of unencrypted data segments, the obfuscated segment names for the plurality of unencrypted data segments and the second portion of the description of the plurality of unencrypted data segments.

13. A computing device comprising:
    a processor; and
    one or more computer-readable storage media containing instructions configured to cause the computing device to perform a method comprising:
       decrypting a description of a plurality of unencrypted data stream segments;
       based on the decrypted description of the plurality of unencrypted data stream segments, de-obfuscating filenames for one or more of the plurality of the unencrypted data stream segments, the de-obfuscating filenames comprising decrypting a filename of a selected one of the plurality of unencrypted data stream segments;

based on the de-obfuscated filenames, determining a presentation order for at least some of the plurality of unencrypted data stream segments; and storing the presentation order in one or more computer-readable storage media.

14. The computing device of claim 13, the method further comprising displaying the at least some of the plurality of unencrypted data stream segments according to the presentation order.

15. The computing device of claim 13, wherein decrypting the description of the plurality of unencrypted data stream segments comprises:

decrypting a header portion of the description of the plurality of unencrypted data stream segments to obtain a key;

decrypting a manifest portion of the description of the plurality of unencrypted data stream segments using the obtained key; and storing the decrypted manifest portion of the description of the assembling order in one or more computer-readable storage media.

16. The computing device of claim 13, wherein the de-obfuscating filenames for one or more of the plurality of the data stream segments further comprises:

generating a key for the filename of the selected one of the plurality of unencrypted data stream segments, wherein the key is based on information contained in the decrypted description of the plurality of unencrypted data stream segments and one or more characteristics of the selected one of the plurality of unencrypted data stream segments;

wherein the decrypting the filename of the selected one of the plurality of unencrypted data stream segments comprises the generated key; and storing the decrypted filename in one or more computer-readable storage media.

17. The computing device of claim 13, wherein the description of the plurality of unencrypted data stream segments comprises presentation orders for two or more data streams encoded at two or more bitrates.

18. One or more computer-readable storage media containing instructions configured to cause a computer to perform a method comprising:

obfuscating names of a plurality of data segments for a plurality of bitrate streams for transmitting a media program, the obfuscating comprising:

generating an augmented base key for a selected segment of the plurality of data segments at least by combining a bitrate of the selected segment with a base key; and encrypting the name of the selected segment of the plurality of data segments using the generated augmented base key, wherein the plurality of data segments comprise unencrypted media program content; and adding a file extension to the encrypted name of the selected segment; and encrypting a manifest comprising the base key and a description of one or more assembling orders of the plurality of data segments for one or more of the plurality of bitrate streams, the encrypting comprising:

generating a manifest key, the generating the manifest key comprising interleaving portions of a variable key with portions of a client key; and encrypting the manifest comprising the base key and the description of the one or more assembling orders of the plurality of data segments at least using the manifest key; and storing in one or more computer-readable storage media the encrypted description of the one or more assembling orders of the plurality of data segments, the encrypted names of the one or more of the plurality of data segments, and the unencrypted media program content.

19. The one or more computer-readable media of claim 18, the method further comprising transmitting the encrypted description of the one or more assembling orders of the plurality of data segments to a remote computer.

20. The one or more computer-readable media of claim 18, the method further comprising transmitting the plurality of data segments to a remote computer in an order other than the one or more assembling orders.

* * * * *

UNITED STATES PATENT AND TRADEMARK OFFICE
CERTIFICATE OF CORRECTION

PATENT NO. : 8,099,599 B2  Page 1 of 1
APPLICATION NO. : 12/202052
DATED : January 17, 2012
INVENTOR(S) : Florin Folta et al.

It is certified that error appears in the above-identified patent and that said Letters Patent is hereby corrected as shown below:

In column 11, line 37, in Claim 16, after "comprises" insert -- using --.

Signed and Sealed this
Sixth Day of March, 2012

David J. Kappos
*Director of the United States Patent and Trademark Office*